United States Patent [19]

Dodson et al.

[11] Patent Number: 5,251,164

[45] Date of Patent: Oct. 5, 1993

[54] LOW-POWER AREA-EFFICIENT ABSOLUTE VALUE ARITHMETIC UNIT

[75] Inventors: Jeffrey M. Dodson, Santa Cruz; Christopher T. Cheng, Palo Alto, both of Calif.

[73] Assignee: S-MOS Systems, Inc., San Jose, Calif.

[21] Appl. No.: 887,511

[22] Filed: May 22, 1992

[51] Int. Cl.$^5$ ................................................. G06F 7/38
[52] U.S. Cl. ................................. 364/715.01; 364/787
[58] Field of Search ..................... 364/715.01, 748, 787

[56] References Cited

U.S. PATENT DOCUMENTS

| | | | |
|---|---|---|---|
| 4,849,921 | 7/1989 | Yasumoto et al. | 364/715.01 |
| 4,953,115 | 8/1990 | Kanoh | 364/715.01 |
| 4,982,352 | 1/1991 | Taylor et al. | 364/715.01 |
| 5,027,308 | 6/1991 | Sit et al. | 364/748 |
| 5,086,405 | 2/1992 | Chung et al. | 364/748 |
| 5,111,421 | 5/1992 | Molnar et al. | 364/748 |
| 5,148,386 | 9/1992 | Hori | 364/715.01 |

OTHER PUBLICATIONS

David A. Patterson and John L. Hennessy, "Computer Architecture A Quantitative Approach", pp. A-1 thru A-62, Computer Arithmetic, Morgan Kaufmann Publishers, Inc. San Mateo, Calif. 1990.

Joseph J. F. Cavanagh, "Digital Computer Arithmetic", Chapter two, Fixed-Point Addition and Subtraction, pp. 98-136, McGraw-Hill Book Company, United States, 1984.

Joseph J. F. Cavanagh, "Digital Computer Arithmetic", Chapter Six, Floating-Point Arithmetic, pp. 353-420, McGraw-Hill Book Company, United States, 1984.

*Primary Examiner*—David H. Malzahn
*Attorney, Agent, or Firm*—Sterne, Kessler, Goldstein & Fox

[57] ABSTRACT

A high-speed, area efficient, low-power absolute value arithmetic unit that efficiently produces the absolute value of the difference of two input operands. This arithmetic unit is adaptable to provide other output functions. Further, the arithmetic unit of the present invention may be utilized as a data path element in a high performance floating point arithmetic unit. The present invention includes a propagate and generate block, a carry-chain and a difference multiplexer. Operands A and B are received by the absolute value arithmetic unit. The propagate and generate block converts operands A and B into propagate signals and generate signals. The carry-chain receives propagate and generate signals and produces carry-chain-propagate signals and carry-chain-generate signals for every bit, where the most significant carry-chain-generate signal is used to indicate a borrow. The difference multiplexer receives the carry-chain-propagate and carry-chain-generate signals as well as propagate singals from the propagate-and-generate block and produces A−B and B−A. The difference multiplexer then selects either A−B or B−A to produce as an output the absolute value of A−B. The borrow signal acts as the selection means for obtaining the absolute value of A−B. In either case, |A−B| is obtained with essentially the same amount of hardware as only one core subtractor. The present invention uses approximately half the amount of hardware as the fastest conventional absolute value arithmetic units and therefore is approximately 50% more compact. The entire absolute value arithmetic unit of the present invention requires essentially the same amount of area as only one conventional adder/subtractor. In addition, the present invention sacrifices no speed to achieve its smaller size and consumes less power than a conventional absolute value subtractor.

13 Claims, 11 Drawing Sheets

FIG. 5C (PRESENT INVENTION)

LOW-POWER AREA-EFFICIENT ABSOLUTE VALUE ARITHMETIC UNIT

BACKGROUND OF THE INVENTION

1. Field of the Invention

The present invention relates generally to an absolute value arithmetic unit for integrated circuits. More particularly, the present invention relates to a high-speed absolute value arithmetic unit utilizing an area-efficient architecture having direct applications in floating point arithmetic.

2. Related Art

Today's personal computers are increasingly being cast into a role that once belonged only to supercomputers. In order to take on this role computers must be able to perform "number crunching" operations quickly and efficiently. In order to perform quickly, high speed arithmetic units are needed. In order to perform efficiently, minimal area should be used to implement a particular mathematical function. One growing area of importance in computer applications is floating point arithmetic.

Floating-point arithmetic expands the range of values over fixed-point arithmetic and assures a specific degree of accuracy for values over this wide numerical range. Arithmetic operations employing floating-point numbers are typically more complicated than the same operations using fixed-point numbers.

A floating-point number is a number n represented by two sets of numbers: the first set being a fixed point part m, and the second set being a radix (base number) r, and an exponent e. Thus: $n = m \times r^e$. The fixed part m is often referred to as the "mantissa." Both m and e can be positive or negative. Generally, the exponent indicates the magnitude of a number. For a more detailed explanation of floating-point systems, see *Digital Computer Arithmetic: Design and Implementation*, Cavanagh, McGraw-Hill Book Company, chapter 6 (1984) incorporated by reference.

In order to add or subtract two numbers in floating-point notation it is necessary to have the same order of magnitude for the exponents. For example, to add

| | |
|---|---|
| $1.752 \times 10^3$ | (Example 1) |
| $+5.331 \times 10^4$ | | requires manipulation of the exponent to yield

| | |
|---|---|
| $0.1752 \times 10^4$ | (Example 1) |
| $+5.331 \times 10^4$ | |

As shown in Example 1, the smaller exponent is incremented to be the same as the larger exponent. Then the mantissa is shifted to the right one position so that the actual value of the number remains the same. Now, it is possible to add these two numbers in straight order fashion.

The function of shifting the fraction and scaling of the exponent occurs frequently in floating-point operations. The general rule implemented by most floating-point systems is to manipulate the smaller of the two numbers to be added or subtracted and leave the larger value alone. In order to adhere to this general rule it is necessary to know which number is bigger and how much to manipulate the smaller number. Accordingly, this is one function of an absolute value subtractor.

Another function of an absolute value subtractor is to determine which mantissa is larger. As shown in Example 2, the exponents are equal in value, but until subtraction is performed it is not known which mantissa is larger:

| | |
|---|---|
| $7.54 \times 10^2$ | (Example 2) |
| $-9.32 \times 10^2$ | |

In this situation, it is desirable to obtain a positive result, because the IEEE floating point format requires a positive valued unsigned integer format. If the result were negative, an extra 2's compliment arithmetic step will need to be performed. This wastes valuable time. To avoid this situation an absolute value subtractor is used to ensure that the difference is positive when the exponents are equal.

There are generally two types of conventional absolute value subtractors. The first type of absolute value subtractor optimizes speed, but requires a tremendous amount of chip area. The second type of absolute value subtractor requires less chip area, but is slow.

A. Absolute Value Subtractor 1

FIG. 1 illustrates a first type of a conventional absolute value subtractor 102. Absolute value subtractor 102 includes: two adders/subtractors 104, 106, and a multiplexer 110. Adder/subtractor 104, 106 are defined in section C below.

The operation of absolute value subtractor 102 involves performing two subtractions: A−B and B−A. The results, R1 and R2, from subtractors 104, 106, respectively, are selected on basis of whether there is a carry out from subtractor 104. R1 is selected if A≧B and R2 is selected if B>A. Multiplexer 110 selects the appropriate result Rn from adders/subtractors 104, 106 to obtain |A−B|.

The drawback with absolute value subtractor 102 is that it uses two adder/subtractors 104, 106. A subtractor is generally much larger than a multiplexer. As a result, the cost of absolute value subtractor 102 in terms of chip area is significant.

B. Absolute Value Subtractor 2

FIG. 2 illustrates a second type of absolute value subtractor 202. Absolute value subtractor 202 includes: an adder/subtractor 204, an inverter 208, an incrementer 210 and a multiplexer 212. Adder/subtractor 204 are defined in section C below. The operation of absolute value subtractor 202 is self-evident from FIG. 2. Either adder/subtractor 204 produces a borrow or a no borrow condition after performing A−B. If A−B does not produce a borrow, then a carry out signal will indicate to multiplexer 212 to select the "A≧B" branch 222 from adder/subtractor 204 to produce |A−B|. Data from subtractor 204 will follow the "B>A" branch 224 from adder/subtractor 204 if there is a borrow condition. In a borrow condition state, the 2's complement is performed by inverter 208 and incrementer 210 to obtain |A−B|.

The drawback with absolute value subtractor 202 is its slow speed. It is generally much slower than absolute value subtractor 102, because the "B>A" data path requires data to pass through a great deal more elements than absolute value subtractor 102.

C. Subtractor defined

A subtractor is a combinational logic circuit. It can be expressed in terms of logical formula whose form describes an adder. How these logical equations are implemented as a circuit is the critical factor. As will be seen, the equations for addition are easily modified in terms of subtraction. For example, the sum of two numbers A and B is commonly expressed as:

$$(A+B)_i = A_i \text{ XOR } B_i \text{ XOR } C_{i-1} \quad (1.0)$$

whereas the difference of A and B is commonly expressed as:

$$(A-B)_i = A_i \text{ XOR } (\text{NOT } B_i) \text{ XOR } C_{i-1} \quad (1.2)$$

Basically, the only difference between A+B and A−B is that in equation (1.2) the B term is NOTed. Other than that equations (1.0) and (1.2) are closely related. Therefore, terms such as "adder/subtractor" and "sum/difference" are often interchanged, because addition and subtraction in digital format are essentially identical, (as can be seen by inspection of equations (1.0) and (1.2)). Hereinafter, reference will be made to subtraction.

The common uncertainty with equation (1.0) and (1.2) is that although values of $A_i$ and $B_i$ are known, the value of the carry term for a previous bit, $C_{i-1}$, remains to be determined.

The carry out of bit i, $C_i$, can be determined by equation (1.5) shown below. Terms $g_i$ and $p_i$ represent generate and propagate encodings of operands A and B. For subtraction, $g_i = A_i B_i$ and $p_i = A_i \text{ XOR } (\text{NOT } B_i)$. For a general background discussion of propagate and generate signals see J. Hennessy et al. *Computer Architecture a Quantitative Approach*, Appendix A, pp. A-32-40 Morgan Kaufmann Publishers Inc. (1990) incorporated by reference; and J. F. Cavanagh, *Digital Computer Arithmetic: Design and Implementation*, Chapter 2 McGraw Hill (1984), incorporated by reference.

$$C_i = g_i + p_i C_{i-1} \quad (1.5)$$

As can be seen, for bit 0, equation (1.5) becomes $C_0 = g_0 + p_0 C_{in}$, and for bit 1, equation (1.5) becomes $C_1 = g_1 + p_1(g_0 + p_0 C_{in})$ and so forth for every bit i. $C_i$ becomes more and more complicated as i increases, as illustrated in equation (1.6):

$$C_i = [g_i + (p_i g_{i-1} + p_i p_{i-1} g_{i-2} + p_i p_{i-1} p_{i-2} g_{i-3} + \cdots + g_0) + (p_i p_{i-1} p_{i-2} \cdots p_0)] C_{in} \quad (1.6)$$

Different methods exist to determine $C_i$. One of the most popular is a carry look ahead approach. Conventional subtractor 104, 106, and 204 (sometimes referred to as carry-lookahead adders CLAs) implement the above-mentioned equations. Such a subtractor is able to obtain the difference of A and B and is the main component of an absolute value subtractor. In order to better understand the present invention, it is necessary to inspect a conventional subtractor 104, 106, 204.

FIG. 3A illustrates a carry-lookahead subtractor 104, 106, 204. The adder is comprised of two main sections: a section 310 produces propagate (p) and generate (g) terms; and a second section 312 utilizes the propagate and generate signals of first section 310 to produce a plurality of carry signals to be summed in the first stage 310 (shown as $D_s$).

Referring to FIG. 3A, inputs A7-A0 and B7-B0 are converted to p's and g's using a plurality of propagate-and-generate/summer cells 302. The various p's and g's, $p_7$-$p_0$ and $g_7$-$g_0$, are combined in carry-chain-cells 304 to produce further P's and G's. Notice that small p's and g's are used to denote signals from propagate-and-generate cells 302 and capitalized P's and G's are used to denote carry-chain-cells 304. As shown in FIG. 3A, the equations for propagate-and-generate/summer cell 302 and carry-chain-cell 304 are illustrated in FIGS. 3B and 3C, respectively.

Generally, referring to FIG. 3A, operands A and B enter at the top of subtractor 104, 106, 204. The signals produced as a result of these inputs flow from the top of subtractor 104, 106, 204 downward through the carry-chain-cells 304, combine with the carry in of bit 0, $C_{in}$, at the bottom of section 312 at carry-chain-cell 304. Then signals flow back up subtractor 104, 106, 204 to form a plurality of carries which are added together to produce the difference D7−D1.

There are a number of problems with carry lookahead subtractor 104, 106, 204, which limit its efficiency. First, as a major component of an absolute value arithmetic unit, it is limited to producing only one core subtraction, either A−B or B−A (the carry-in is fixed at zero or one i.e., see equations above and fix Cin at 0 or 1). Second, its carry-chain 312 and propagate-and-generate/summer 302 provide a minimal amount of information regarding propagate and generate terms. In other words, carry-chain 312 only provides carry out information for each bit. Third, subtraction/addition is performed in a convoluted inefficient way. The data flow is first fed down and then up the adder/subtractor resulting in more wires. In general data flow is better in one direction because wiring can be minimized. Additionally, many logic instructions are performed in a dense area making the design unnecessarily complicated.

D. Summary of the problem

Currently absolute value subtractors are available, but they are slow and/or large in area (large area usually results in more power consumption). Therefore, what is needed is an absolute value subtractor which is as fast as, or faster than, absolute value subtractors 102, 202 and is smaller than either of absolute value subtractors 102, 202 and requires less power.

SUMMARY OF THE INVENTION

The present invention is directed to a high-speed, area efficient, low-power absolute value arithmetic unit. This arithmetic unit efficiently produces the absolute value of the difference of two input operands. This arithmetic unit is adaptable to provide other output functions. Further, the arithmetic unit of the present invention may be utilized as a data path element in a high performance floating point arithmetic unit.

An essential underlying theme of the present invention is that A−B and B−A can be obtained without performing two separate subtractions. This is accomplished by a unique absolute value arithmetic unit that employs a unique carry-chain-configuration to obtain a carry-chain-propagate signal and a carry-chain-generate signal for each bit so that at a final level of the carry chain, a unique difference multiplexer is able to perform a simple one step addition process to obtain both results A−B and B−A; and additionally further select the correct result to obtain $|A-B|$.

The present invention includes an absolute value arithmetic unit which includes a propagate-and-generate block, a carry-chain and a difference multiplexer.

Operands A and B are received by the absolute value arithmetic unit. The propagate-and-generate block converts operands A and B into propagate signals and generate signals. The carry-chain receives propagate and generate signals and produces carry-chain-propagate signals and carry-chain-generate signals for every bit, where the most significant carry-chain-generate signal is used to indicate a borrow. The difference multiplexer receives the carry-chain-propagate and carry-chain-generate signals as well as propagate signals from the propagate-and-generate block and produces A−B and B−A. The difference multiplexer then selects either A−B or B−A to produce as an output the absolute value of A−B. The borrow signal acts as the selection means for obtaining the absolute value of A−B. In either case, |A−B| is obtained with essentially the same amount of hardware as only one core subtractor (approximately twice as compact as absolute value subtractor 102 and less area with greater speed than absolute value subtractor 202).

Additionally, the core absolute value subtractor section of the absolute value arithmetic unit is adaptable to operate in conjunction with a number of optional circuit elements. These options include extended functionality.

The extended functionality option includes the choice to select all possible logical functions for inputs A and B, such as AND, OR, NOR, XOR, XNOR, NAND, etc., as well as |A|, |B|, −A, −B. This is accomplished by minor additional hardware which permits changes to the A and B inputs to the propagate and generate block.

The present invention uses approximately half the amount of hardware as the fastest conventional absolute value arithmetic units and therefore is approximately 50% more compact. Remarkably, the entire absolute value arithmetic unit of the present invention requires essentially the same amount of area as only one conventional adder/subtractor. In addition, the present invention sacrifices no speed to achieve its smaller size and consumes less power than a conventional absolute value subtractor.

Further features and advantages of the present invention, as well as the structure and operation of various embodiments of the present invention, are described in detail below with reference to the accompanying drawings.

BRIEF DESCRIPTION OF THE DRAWINGS

FIGS. 5A-5C illustrate a symbolic comparison of prior art absolute value subtractors (FIGS. 5A and 5B) with the present invention (FIG. 5C).

FIGS. 7A-1 and 7A-2 (referred to collectively as FIG. 7A) each show one half of a cell arrangement for an eight bit example of an absolute value arithmetic unit, which combine to form one circuit according to the present invention.

In the drawings, like reference numbers indicate identical or functionally similar elements. Additionally, the left-most digit of a reference number identifies the drawing in which the reference number first appears.

DETAILED DESCRIPTION OF THE INVENTION

I. General Overview

Figure 1:
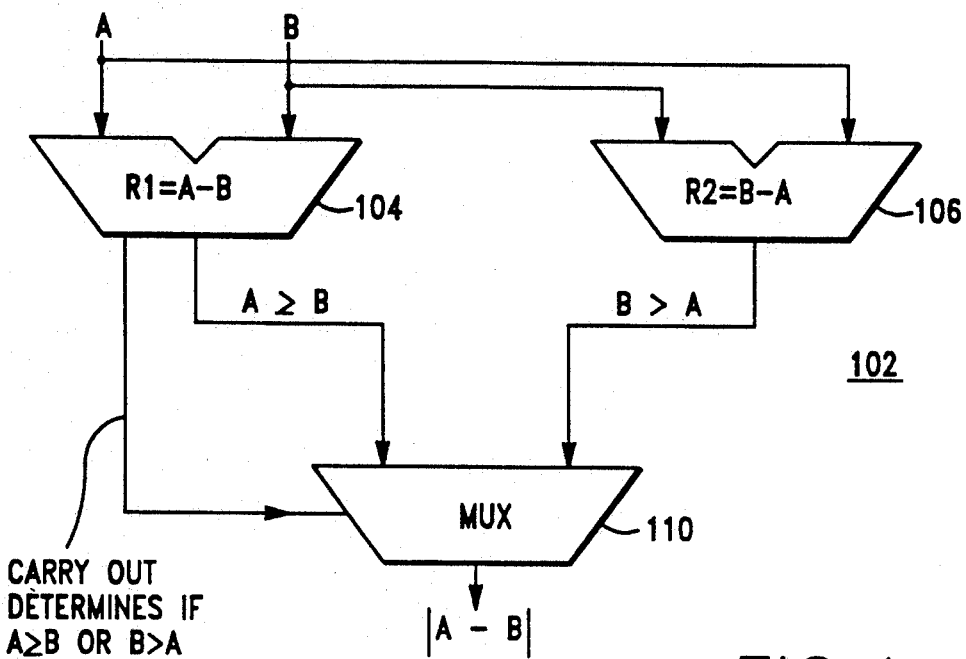
FIG. 1 illustrates a first type of conventional absolute value subtractor.

The present invention relates to a high-speed absolute value arithmetic unit utilizing an area-efficient architecture having direct applications in floating point arithmetic. The present invention is described in the detailed description section with reference to three main sections. The first section is directed to the theory of operation underlying the present invention. The second section is directed to a hardware embodiment of the present invention. The third section is directed to optional features that may be added to the core invention to provide desired output functions.

II. Theory of operation

The theory of operation for the present invention involves one major theme: that A−B and B−A can be obtained by an absolute value arithmetic unit that only needs to perform one core subtraction. This is accomplished by a unique absolute value arithmetic unit that employs a unique carry-chain configuration to obtain a propagate-and-generate term for each bit so that at a final level of the carry chain, a unique difference multiplexer is able to perform a simple one step addition process to obtain both A−B and B−A; and additionally further select the correct result to obtain |A−B|.

As described in the Background section, typically two subtractions are needed to find the absolute value of two numbers A and B. These two subtraction functions include A−B and B−A.

A major feature of the present invention is an absolute value arithmetic unit requiring only one core subtraction. This will be explained by showing the similarity of A−B and B−A, where A and B can be any N-bit width numbers, where N is a predetermined integer $\geq 1$. The function B−A can be modified to a format similar to A−B as follows:

| | | |
|---|---|---|
| B − A | = B − A | (2.0) |
| | = B − A + 1 − 1 | (2.1) |
| | = −(A − B − 1) − 1 | (2.2) |
| | = NOT(A − B − 1) + 1 − 1 | (2.3) |
| | = NOT(A − B − 1) | (2.4) |

To generate expression (2.3), the two's complement identity was performed on expression (2.2). The two's complement identity is written as: $-z = NOT(z) + 1$. In this case, $z = (A - B - 1)$.

Since subtraction is easily performed in terms of addition it helpful to rearrange operations $A - B$ and $B - A$ in terms of addition, where:

$$A - B = A + (NOT\ B) + 1 \tag{2.5}$$

$$B - A = NOT(A + (NOT\ B) + 0) \tag{2.6}$$

The difference between equations (2.5) and (2.6) is twofold. First, equation (2.5) has a carry-in $C_{in} = 1$ while equation (2.6) has a carry-in $C_{in} = 0$. Second, equation (2.6) is logically inverted (NOTed).

The present invention takes advantage of these two differences in expressions (2.5) and (2.6). First, a core subtraction is performed such that the core subtraction results are independent of the carry-in. Second, a difference multiplexer resolves the two differences in equations (2.5) and (2.6) by providing a carry-in and the logical NOT to produce both terms $A - B$ and $B - A$ from the core subtraction outputs. The core subtraction and difference multiplexer (sometimes to referred to as a mux) are described in more detail below.

The core subtraction provides the inputs to difference equation (1.2).

$$(A - B)_i = A_i\ XOR\ (NOT\ B_i)\ XOR\ C_{i-1} \tag{1.2}$$

In this equation, $A_i$ and $B_i$ are given in equation (1.2), but $C_{i-1}$ must be computed. Equation (1.6) demonstrates how $C_i$ can be computed, and correspondingly $C_{i-1}$.

$$C_i = [g_i + (p_i g_{i-1} + p_i p_{i-1} g_{i-2} + p_i p_{i-1} p_{i-2} g_{i-3} + \cdots \\ + g_0) + (p_i p_{i-1} - p_{i-2} \cdots p_0)] C_{in} \tag{1.6}$$

$$C_{i-1} = [g_{i-1} + (p_{i-1} g_{i-2} + p_{i-1} p_{i-2} g_{i-3} + p_{i-1} p_{i-2} p_{i-3} g_{i-4} + \cdots \\ + g_0) + (p_{i-1} p_{i-2} - p_{i-3} \cdots p_0)] C_{in}$$

The core subtraction simplifies equation (1.6) to three terms, two terms independent of the carry-in $C_{in}$, with the third term being the carry-in $C_{in}$ as follows:

$$C_i = G_{0,i} + P_{0,i} C_{in} \tag{2.7}$$

The $G_{0,i}$ term is referred to as a carry-chain-generate signal. $G_{0,i}$ represents a generated carry out of bit i from bit 0 to bit i. The $P_{0,i}$ term is referred to as a carry-chain-propagate signal. $P_{0,i}$ reflects the propagation of $C_{in}$ from bit 0 to bit i. The method in which the core subtraction produces carry-chain-generate and carry-chain-propagate signals from inputs A and B is described in the hardware section below.

Differences $A - B$ in equation (2.5) and $B - A$ in equation (2.6) can be computed from the core subtraction outputs carry-chain-generate and carry-chain-propagate signals in a difference multiplexer. The difference multiplexer first computes both $A - B$ and $B - A$, then selects the positive result to get the absolute value difference.

First, $A - B$ is computed as follows:

$$(A - B)_i = A_i\ XOR\ (NOT\ B_i)\ XOR\ C_{i-1} \tag{1.2}$$

Replacing $(A_i\ XOR\ (NOT\ B_i))$ with $p_i$ and $C_{i-1}$ with $(G_{i-1} + P_{i-1} C_{in})$ results in equation (2.9):

$$(A - B)_i = p_i\ XOR\ (G_{0,i} + P_{0,i} C_{in}) \tag{2.9}$$

But $C_{in} = 1$ in equation (2.5), so (2.9) reduces to:

$$(A - B)_i = p_i\ XOR\ (G_{0,i} + P_{0,i}) \tag{2.10}$$

$B - A$ is computed similarly as follows:

$$(B - A)_i = NOT(A_i\ XOR\ (NOT\ B_i)\ XOR\ C_{i-1}) \tag{2.11}$$

Replacing $(A_i\ XOR\ (NOT\ B_i))$ with $p_i$ and $C_{i-1}$ with $(G_{i-1} + P_{i-1} C_{in})$ results in equation, as well as setting $C_{in} = 0$ according to (2.6), results in equation (2.12):

$$(B - A)_i = NOT(p_i\ XOR\ G_{0,i}) \tag{2.12}$$

The positive result of $A - B$ and $B - A$ is selected by a specific output of the core subtraction, the carry-chain-generate from the most significant bit $G_{0,N-1}$. Carry-chain-generate $G_{0,N-1}$ tells if $A > B$ or $B > A$ as follows:

if $G_{0,N-1} = 1$, then $A > B$ and $A - B$ will be positive if $G_{0,N-1} = 0$, then $A <= B$ and $B - A$ will be positive Based on $G_{0,N-1}$ and $A - B$ and $B - A$, the absolute value of the difference for each bit i, $D_i$, can be computed as follows:

$$D_i = G_{0,N-1} (A - B)_i + NOT(G_{0,N-1}) (B - A)_i \tag{2.13}$$

Using (2.10) and (2.12), $$D_i = G_{0,N-1} (p_i\ EXOR\ (G_{0,i} + P_{0,i})) + NOT(G_{0,N-1}) \\ (NOT(p_i\ EXOR\ G_{0,i})) \tag{2.14}$$

The absolute value subtractor of the present invention incorporates the above mentioned equations in hardware having a propagate-and-generate block a carry chain (both the propagate-and-generate block and carry chain comprise the subtraction/addition core), and the difference multiplexer.

III. Hardware

Figure 2:
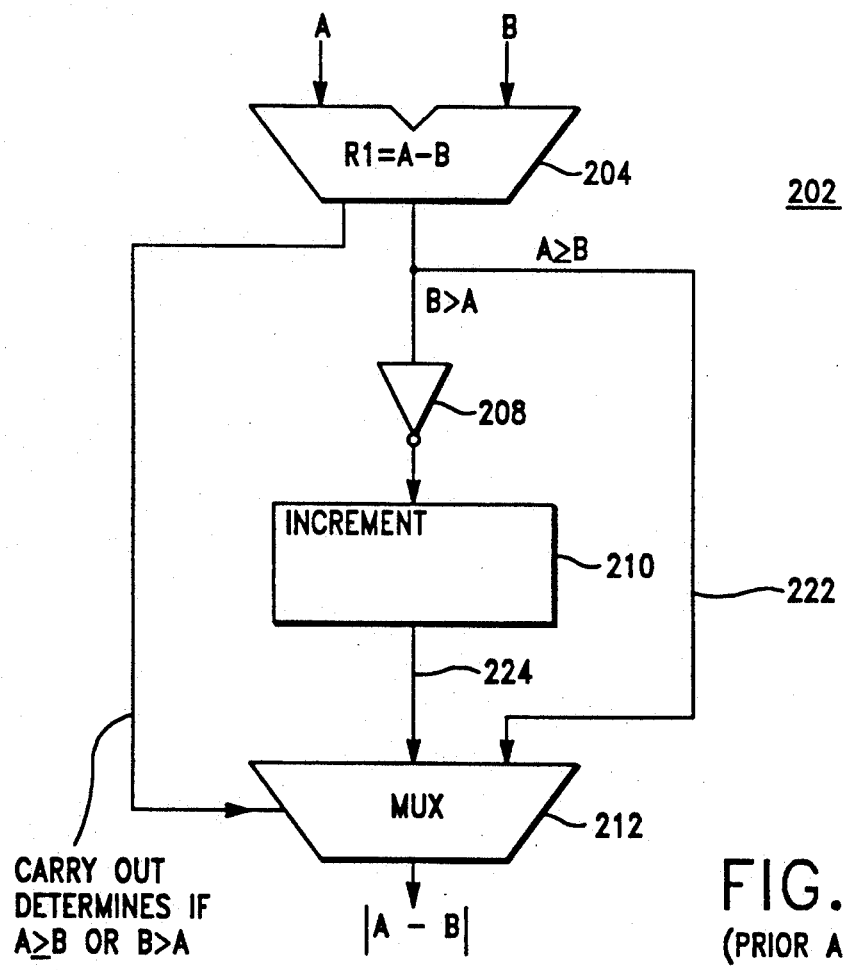
FIG. 2 illustrates a second type of conventional absolute value subtractor.
Figure 3A:
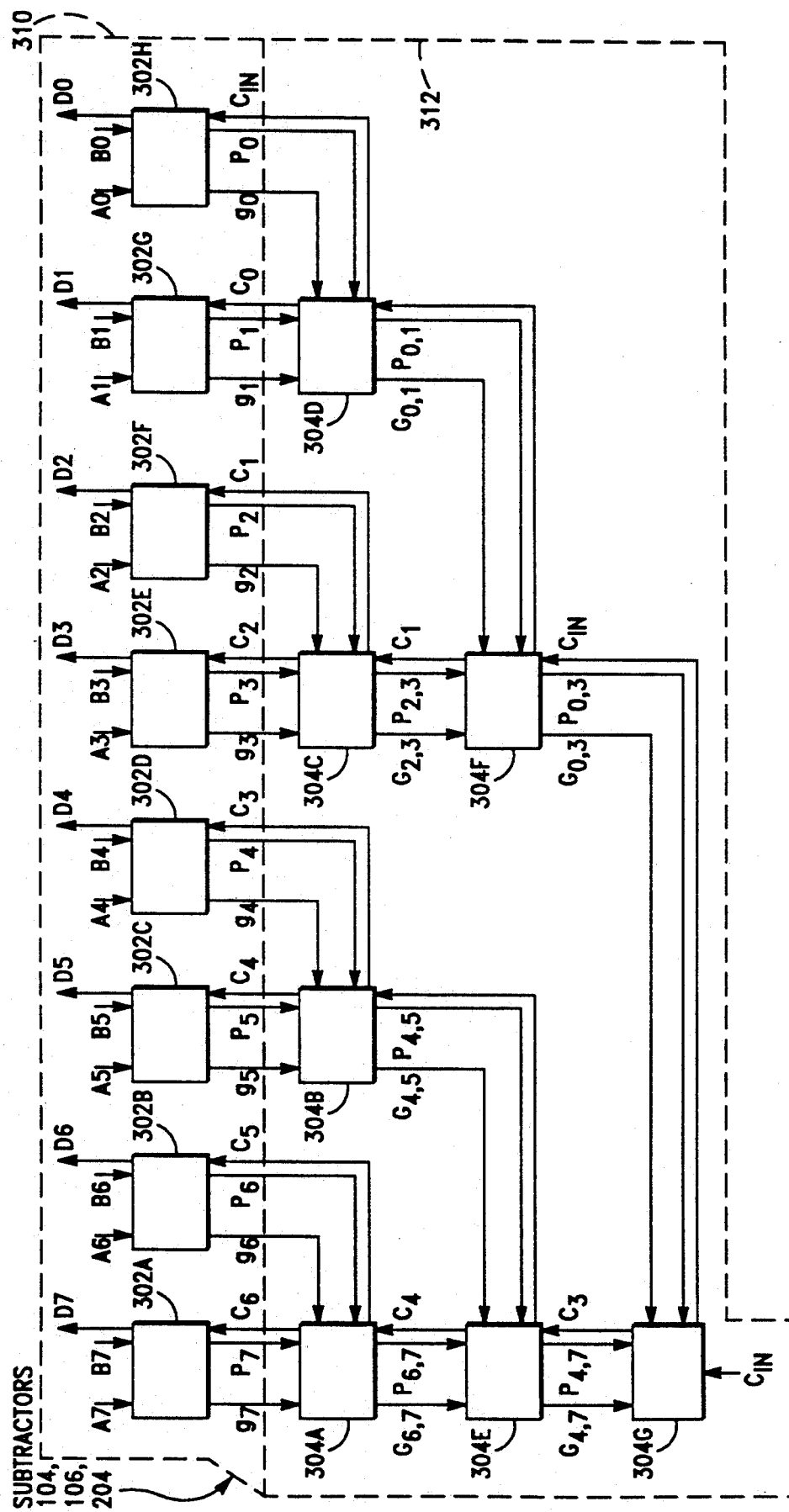
FIG. 3A illustrates a conventional carry look-ahead subtractor in an eight bit implementation.
Figure 3B:
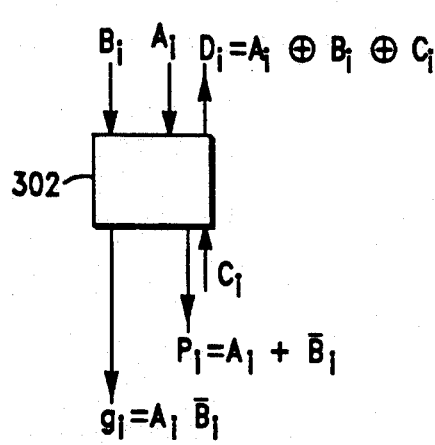
FIG. 3B illustrates logical equations for propagate-and-generate/summer cell 302.
Figure 3C:
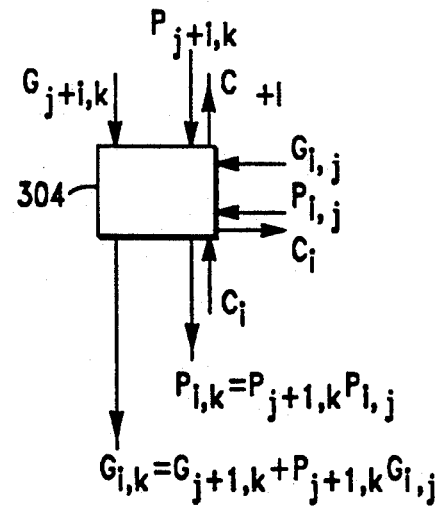
FIG. 3C illustrates logical equations for carry-chain cell 304.
Figure 4:
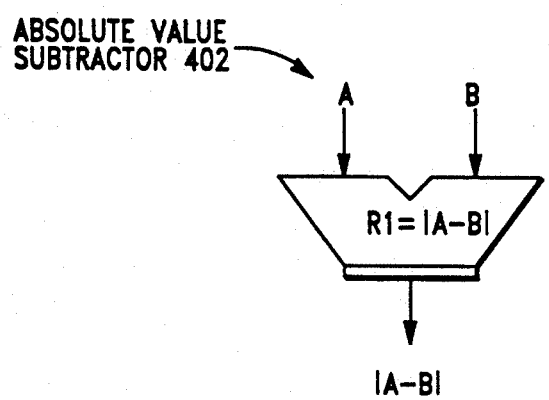
FIG. 4 illustrates a symbol for the present invention.

This section is directed to a hardware implementation of an absolute value arithmetic unit according to the present invention. FIG. 4 illustrates a high level symbolic representation of absolute value arithmetic unit 402. Absolute value arithmetic unit 402 is comparable in size to individual conventional subtractors 104 or 106 or 204, shown in FIGS. 1 and 2. In fact, it is possible that absolute value arithmetic unit 402 employs less hardware than some single unit adders/subtractors. Absolute value arithmetic unit 402 is compact and fast, because it employs a unique theory of operation uncommon to adders/subtractors. As explained in the theory of operation, this is accomplished by means of a carry-chain that produces carry-chain-propagate and carry-chain-generate signals independent of the carry-in term and a new sum/difference multiplexer custom made for the unique carry-chain.

Figures 5A, 5B:
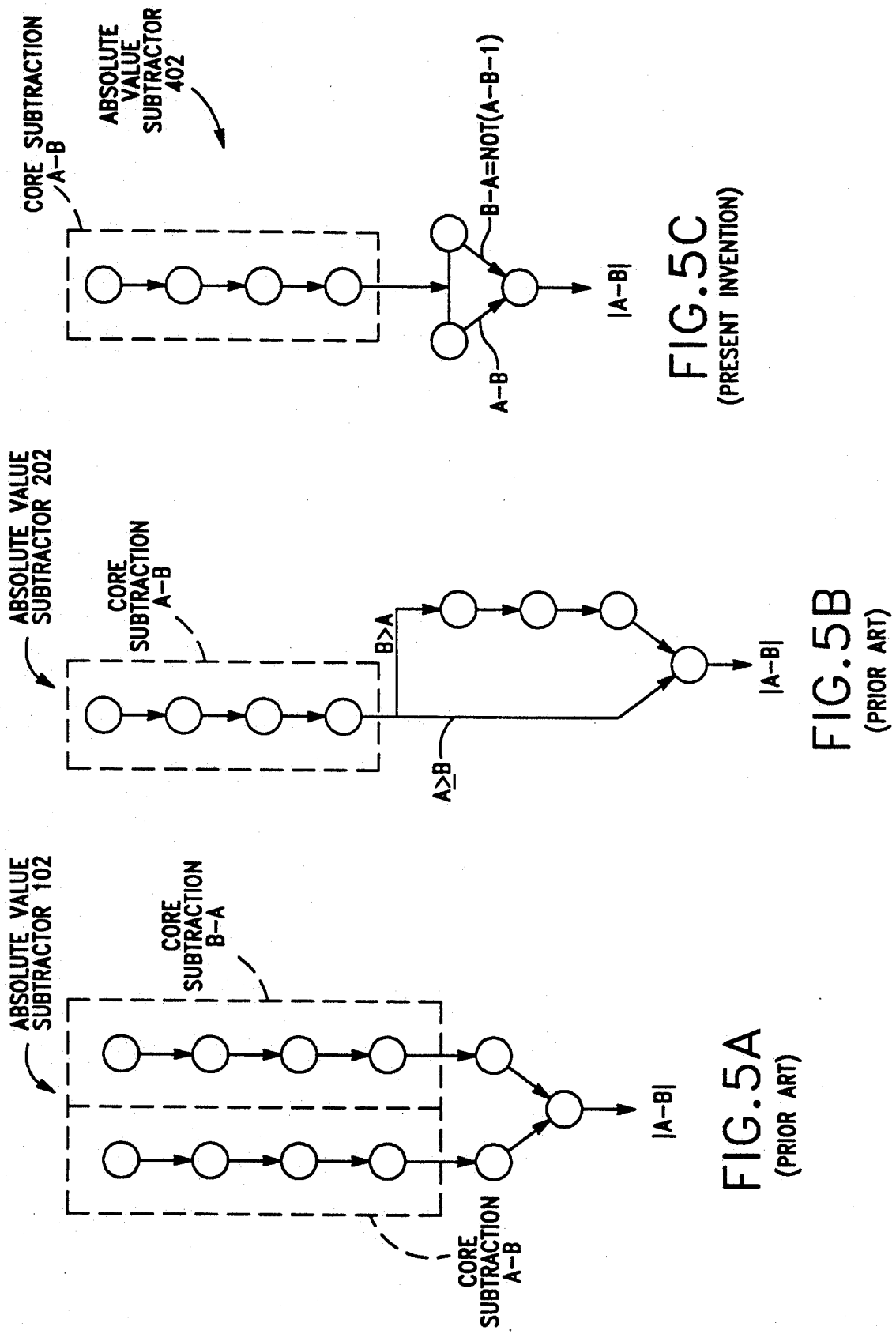

FIGS. 5A-5C contrast the differences between the two prior art methods of absolute value subtractor 102 and 202 (FIGS. 5A and 5B, respectively) and the present invention (FIG. 5C). FIGS. 5A-5C are a symbolic representation of data flow. Circles in FIGS. 5A-5C are used to show relative complexity of a circuit. They do not represent components.

Note that absolute value subtractor 102 utilizes two core subtractions and, as mentioned above, requires a large amount of chip area. Whereas absolute value arithmetic unit 402 (to be described in more detail), only requires one core subtraction and thus requires approximately 50 percent less space.

Absolute value subtractor 202 and absolute value subtractor 402, both include one core subtraction of A and B. However, absolute value subtractor 202 requires an extra execution path which is expensive in terms of both area and delay.

Figure 6:
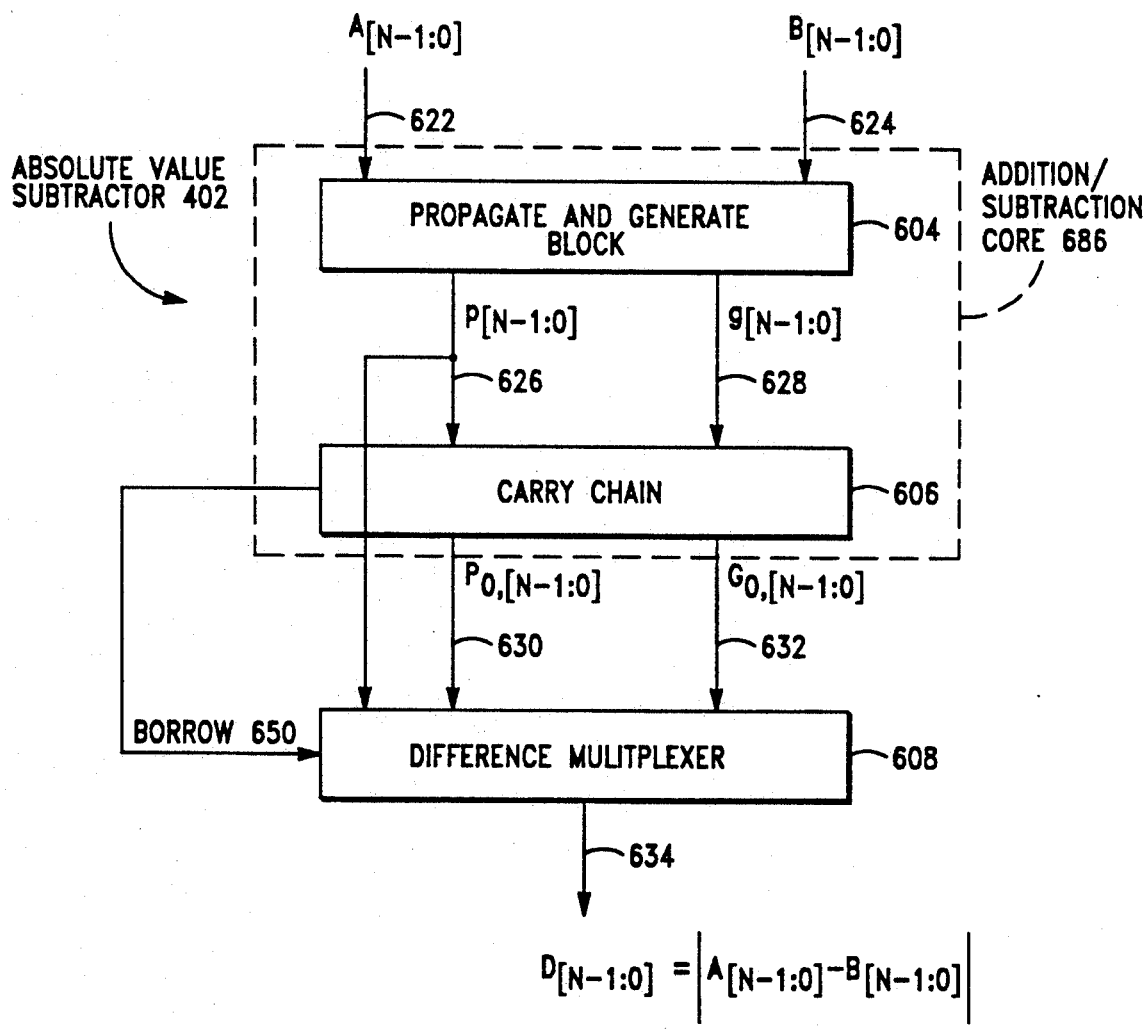
FIG. 6 illustrates a high level block diagram of an absolute value arithmetic unit according to the present invention.

FIG. 6 illustrates a high level block diagram of absolute value arithmetic unit 402. Absolute value arithmetic unit 402 includes a propagate-and-generate block 604, a carry-chain 606 and a difference multiplexer 608. These elements are described in more detail below. Operands A 622 and B 624 are integers in any integer format, e.g., 2's complement, 1's complement, sign magnitude, biased, and unsigned integer format. In a preferred embodiment unsigned integer format is used.

Propagate and generate block 604 converts operands A 622 and B 624 into propagate signals (p) 626 and generate signals (g) 628. Carry-chain 606 receives signals 626 and 628 and produces carry-chain-propagate-signals 630, carry-chain-generate-signals 632 and a borrow signal 650. Difference multiplexer 608 receives signals 626, 630, 632 and 650 and produces $A-B$ and $B-A$. Difference multiplexer 608 then selects either $A-B$ or $B-A$ to produce as an output the absolute value of $A-B$. Borrow signal 650 acts as the selection means for obtaining the absolute value of $A-B$. In either case, $|A-B|$ is obtained with essentially the same amount of hardware as only one core subtractor (twice as compact as absolute value subtractor 102 and less area with greater speed than absolute value subtractor 202). As mentioned above, note that propagate-and-generate block 604 and carry-chain 606 comprise the subtraction/addition core 686. The operation and structure of absolute value subtractor 402 will now be described in greater detail.

FIG. 7 illustrates a cell arrangement for an eight bit example of an absolute value arithmetic unit according to the present invention. Absolute value arithmetic unit 702 includes three main components: propagate-and-generate block 604, carry-chain 606 and difference multiplexer 608. Each component is comprised of a plurality of corresponding leaf cells.

In microelectronic technology, repeating units of layout are often used. These units are called leaf cells. Leaf cells may be combined to form larger units. The term leaf cell has come to mean a basic building block of a larger unit.

For instance, propagate-and-generate block 604 is comprised of a plurality of propagate-and-generate leaf cells 704; carry-chain 606 is comprised of a plurality of carry-chain-leaf cells 706; and difference multiplexer 608 is comprised of a plurality of leaf cells 708. Absolute value arithmetic unit 702 receives two 8-bit inputs A and B and produces $D_i = (|A_i - B_i|)$ in difference multiplexer 608. Leaf cells for each component will now be described.

A. Propagate-and-Generate Leaf Cell

Figure 7B:
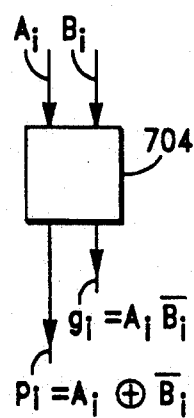
FIG. 7B illustrates the logical equations for a propagate-and-generate leaf cell according to the present invention.
Figure 7C:
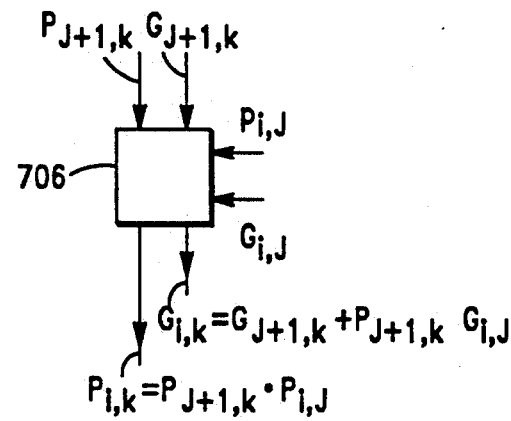
FIG. 7C illustrates the logical equations for a carry-chain leaf cell according to the present invention.
Figure 7D:
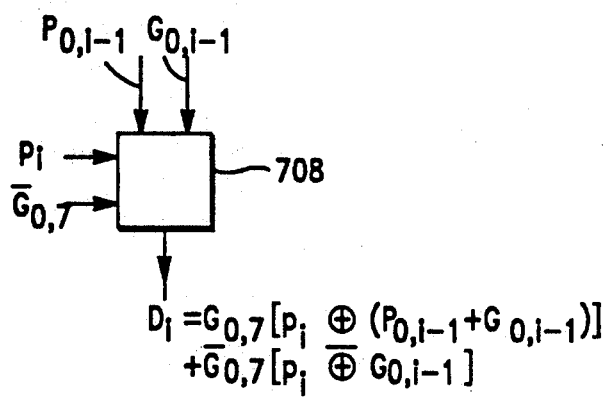
FIG. 7D illustrates the logical equations for a difference multiplexer leaf cell according to the present invention.

There are many ways to implement a generate and propagate circuit in a microelectronic device. Typically, all generate-and-propagate circuits have in common the same end result: a generate signal and a propagate signal. In other words, propagate-and-generate block 604 encodes operands A 622 and B 624 into a propagate signal 626 and a generate signal 628. For subtraction, generate signal 628 represents A AND NOT B. For subtraction, propagate signal 626 represents A XNOR B. The logical equations for propagate and generate leaf cell 604 are also shown in FIG. 7B.

Propagate and generate signals are common in digital computer arithmetic. Typically, generate and propagate signals from a generate and propagate circuit are necessary inputs for a carry chain. Propagate and generate signals can also be represented as propagate and "kill" signals, wherein kill represents the logical NOR of the propagate and generate signals.

Figure 8:
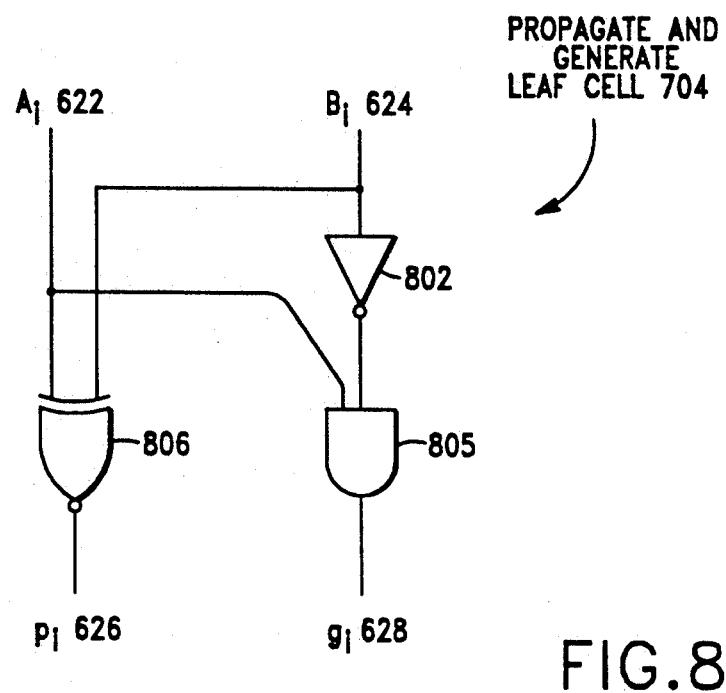
FIG. 8 illustrates a logic representation of a leaf cell for a propagate-and-generate block according to the present invention.

FIG. 8 illustrates a leaf cell 704 of propagate and generate block 604. Propagate-and-generate leaf cell 704 includes: inputs $A_i$ 622 and $B_i$ 624, an inverter 802, an AND gate 805, an XNOR gate 806, and output signals propagate $p_i$ 626 and generate $g_i$ 628. As explained in the logical expressions above, generate signal $g_i$ 628 is produced by passing signals $A_i$ 622 and $B_i$ 624 through inverter 802 and AND gate 805. Propagate signal $p_i$ 626 is produced by passing signals $A_i$ 622 and $B_i$ 624 through XNOR gate 806.

Figures 1, 7A:
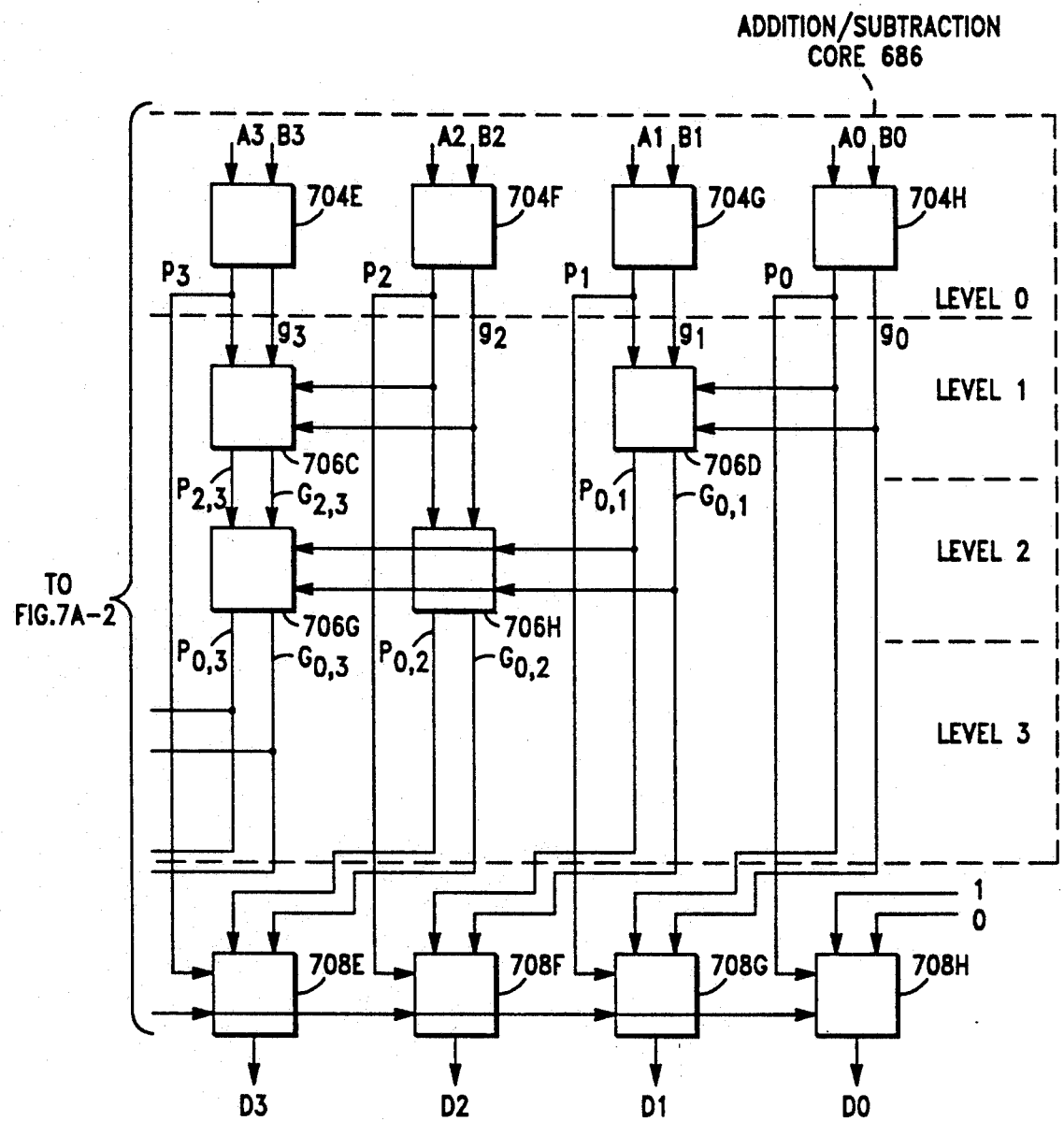
Figures 2, 7A:
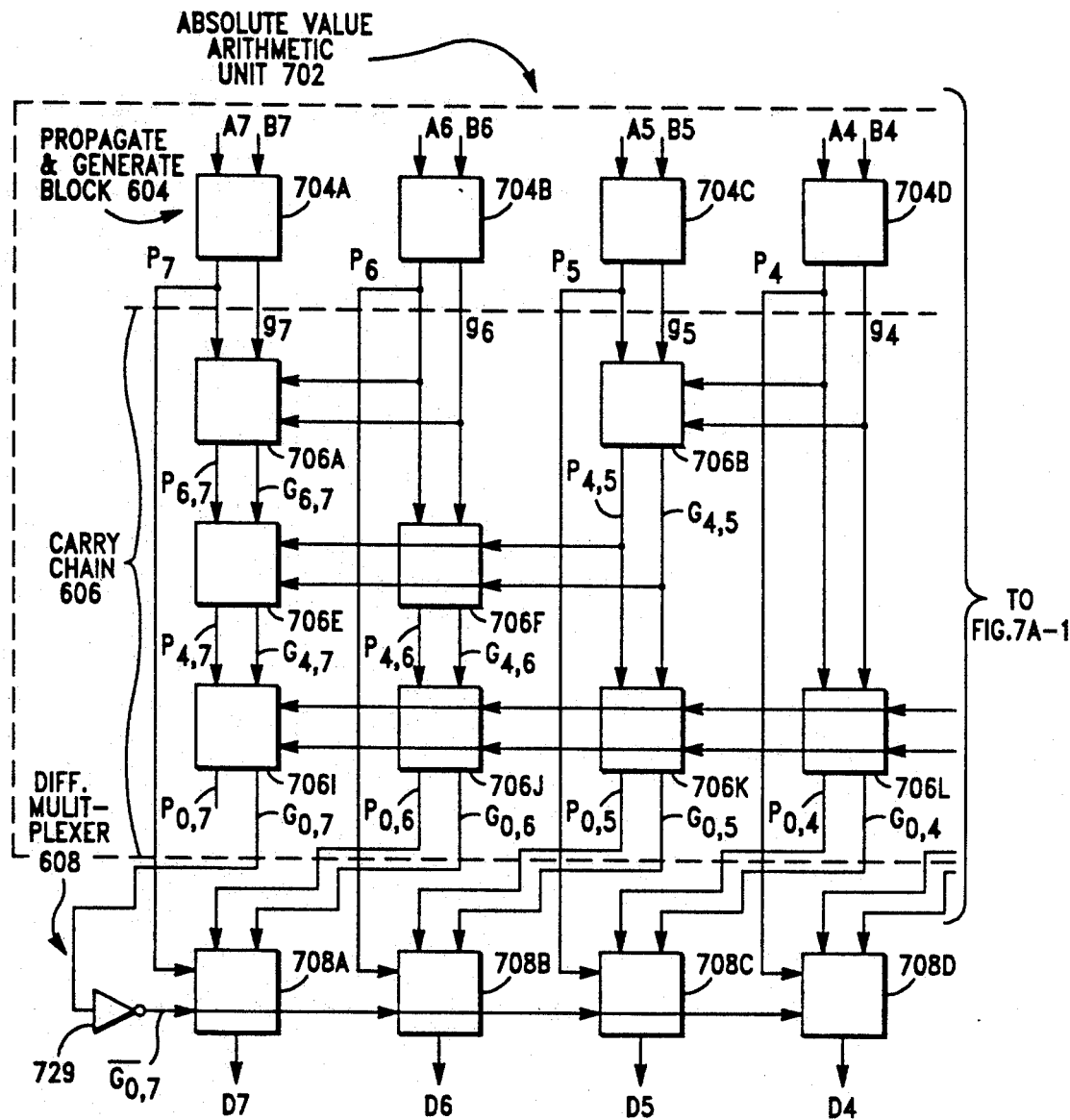

Propagate and generate signals 626 and 628 are coupled to carry-chain 606 as shown in FIGS. 6 and 7A. Propagate and generate signals 626 and 628 makeup a first level (level 0) of absolute value arithmetic unit 702.

In the preferred embodiment, a fan-in of two was employed. Fan-in in this application means the number of signals which are received by a leaf cell. A propagate and generate leaf cell may be designed with a larger fan-in, but such a cell would be more complex and thus might operate more slowly. A larger fan-in would, however, decrease the numbers of levels needed to produce a desired result. One skilled in the art can appreciate that application dependent modifications can be made to the leaf cells described below to obtain an optimal desired result.

B. Carry Chain Leaf Cell

Part of 7A illustrates an 8-bit carry-chain-606. Carry-chain-606 is comprised of a plurality of carry-chain-leaf cells 706. Leaf cells 706 are located at multiple levels of carry-chain 606. Particularly, carry-chain 606 includes 3 levels, level 1, level 2, and level 3, with propagate and generate block 704 representing the first level, level 0. The number of levels in a carry-chain is determined by both the fan-in (the number of inputs) into each level and the number of bits, N. The fan-in is technology dependent; the number of bits is application dependent. For example, in the preferred embodiment a fan-in of four for each level of the carry-chain-was incorporated, because in the available CMOS technology this provided the optimal performance. However, other technologies may lend themselves to larger fan-ins or variable fan-ins with each level. An example of the number of bits N being application dependent is seen in single precision floating point arithmetic where the exponent width is eight bits and the mantissa width is twenty four bits.

This section is directed primarily to a carry-chain-leaf cell 706. In the preferred embodiment a fan-in of four was employed. A larger fan-in would, however, decrease the number of levels in carry-chain-606. One skilled in the art can appreciate that application dependent modifications to fan-in can be made to the leaf cells to obtain a desired result.

Figure 9:
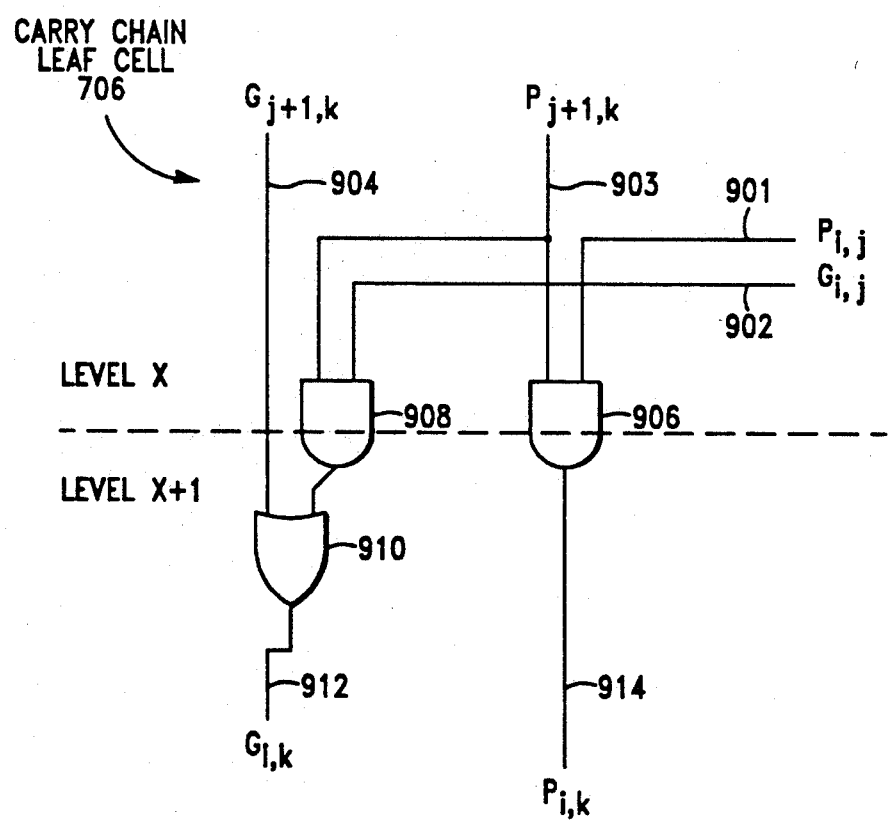
FIG. 9 represents a logic gate implementation of a carry-chain-leaf cell according to the present invention.

FIG. 9 represents a logic gate implementation of the following equations:

$$P_{i,k} = P_{j+1,k} \text{ AND } P_{i,j} \tag{3.1}$$

$$G_{i,k} = G_{j+1,k} \text{ OR } (P_{j+1,k} \text{ AND } G_{i,j}) \tag{3.2}$$

A leaf cell 706 includes four input signals and four output signals. Input signals include: carry-chain-generate signal ($G_{j+1,k}$) 904, carry-chain-propagate signal ($P_{j+1,k}$) 903, carry-chain-generate signal ($G_{i,j}$) 902 and carry-chain-propagate signal ($P_{i,j}$) 901. Output signals include: ($P_{i,k}$) 912, ($G_{i,k}$) 914. As shown in FIG. 9, leaf cell 706 includes AND gates 906, 908, and OR gate 910 (those skilled in the art realize that each logic function can be realized many different ways).

C. Carry Chain Leaf Cell Interconnection

One of the key factors of the present invention is the methodology used to connect carry-chain-leaf cells 706 to comprise carry-chain 606. The significance of this methodology is to provide carry-chain-propagate signals and carry-chain-generate signals for every bit i.

Carry-chain-propagate signal $P_{0,i}$ 630 reflects the propagation of $C_{in}$ from bit 0 to bit i. Carry-chain-generate signal $G_{0,i}$ 632 reflects a generated carry out of bit i from bit 0 to bit i.

Figure 10:
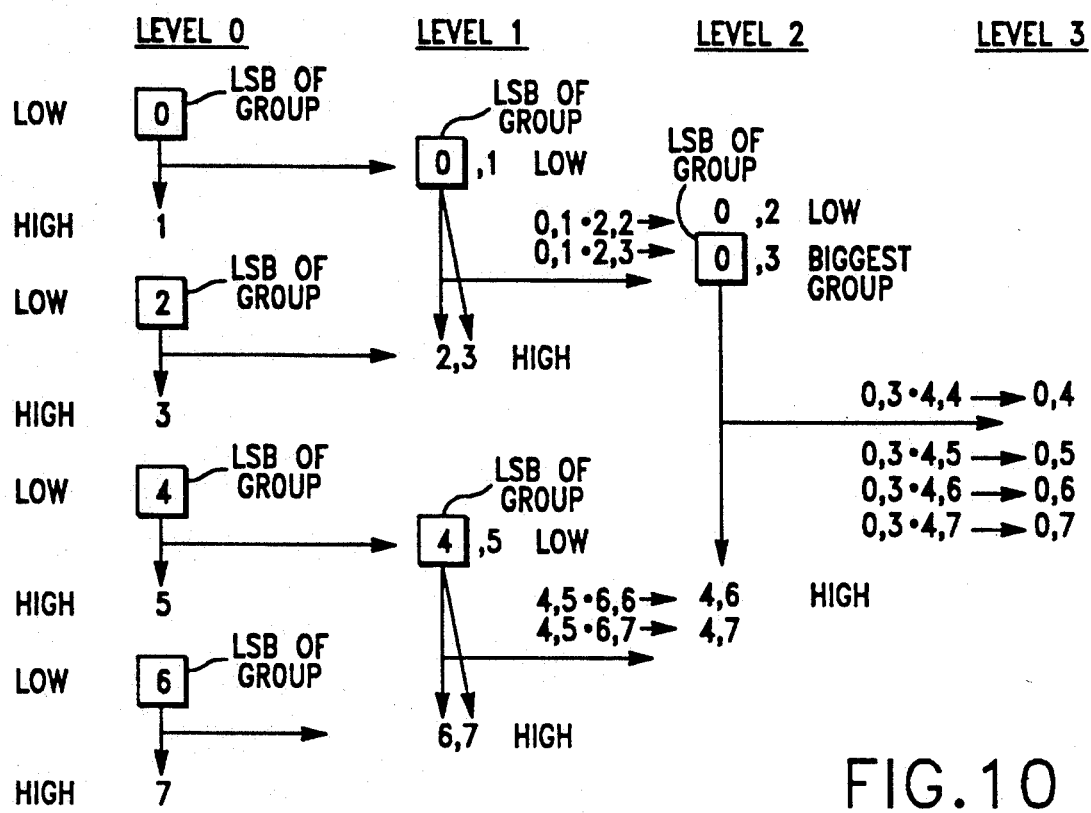
FIG. 10 illustrates methodology used to connect carry-chain-leaf cells to comprise a carry-chain according to the present invention.

The methodology used to connect carry-chain-leaf cells 706 of carry-chain-606 for an eight bit example is illustrated in FIG. 10. In other words, FIG. 10 represents how carry-chain-propagate signals and carry-chain-generate signals are grouped for each level of absolute value arithmetic unit 702 (levels of FIG. 10 correspond to the levels of FIG. 7A). In FIG. 10, each number (0-7) located in a column represents a carry-chain-propagate and a carry-chain-generate signal pair. Referring to equations (3.1) and (3.2), i,k represents the new grouping of bits i through k created from previous level groupings i,j and j+1,k.

$$P_{i,k} = P_{j+1,k} \text{ AND } P_{i,j} \tag{3.1}$$

$$G_{i,k} = G_{j+1,k} \text{ OR } (P_{j+1,k} \text{ AND } G_{i,j}) \tag{3.2}$$

An example in FIG. 10 is seen in the level 2 grouping 0,2 created from level 1 groupings 0,1 and 2,3 with i=0, j=1, j+1=2, and k=2. Another example is seen in FIG. 10 for level 3 grouping 0,6 created from level 2 groupings 0,3 and 4,6 with i=0, j=3, j+1=4, and k=6.

In general, the groupings in the present invention follow three rules:

1. groups are divided into low and high categories;
2. the largest group in the low category is combined with every bit of the high category;
3. groupings continue until every bit is combined down to bit 0;

In FIG. 10, the completed groupings for each bit are as follows: 0,0 0,1 0,2 0,3 0,4 0,5 0,6 and 0,7. These groupings are the outputs of the carry chain, where each grouping represents the pair of signals carry-chain-propagate and carry-chain-generate. The outputs of the carry-chain-connect to difference multiplexers 608 as shown in FIG. 7A.

Referring to FIG. 7, with the exception of the leaf cell in the most significant bit position, in a final level of carry-chain-606, leaf cells 706 are either coupled to another leaf cell 706 or to difference multiplexer 608.

Referring to FIG. 7A, leaf cell 708 at the most significant bit position of level 3 of carry-chain 606 is coupled to an inverter 729. Signal 650 from inverter 729 represents borrow signal 650. Inverter 729 is used as a buffer to drive the large load seen by borrow signal 650. Borrow signal 650 is coupled to difference multiplexers 708.

D. Difference Multiplexer Leaf Cell

Difference multiplexer 608 generates the differences A−B and B−A from the outputs of carry-chain-606. Additionally, difference multiplexer 608 selects the positive result between A−B and B−A based on the generate signal from the MSB ($G_{0,7}$ shown in FIG. 7A). Difference multiplexer leaf cell 708 provides the absolute value difference $D_i$ according to the following equation:

$$\begin{aligned}D_i = &G_{0,N-1} (p_i \text{ XOR } (G_{0,i}+P_{0,i})) + NOT(G_{0,N-1}) \\ &(NOT(p_i \text{ EXOR } G_{0,i}))\end{aligned} \tag{2.14}$$

$$\text{where } (A-B)_i = p_i \text{ XOR } (G_{0,i}+P_{0,i} C_{in}) \tag{2.9}$$

$$\text{and } (B-A)_i = NOT(p_i \text{ XOR } G_{0,i}) \tag{2.12}$$

Figure 11:
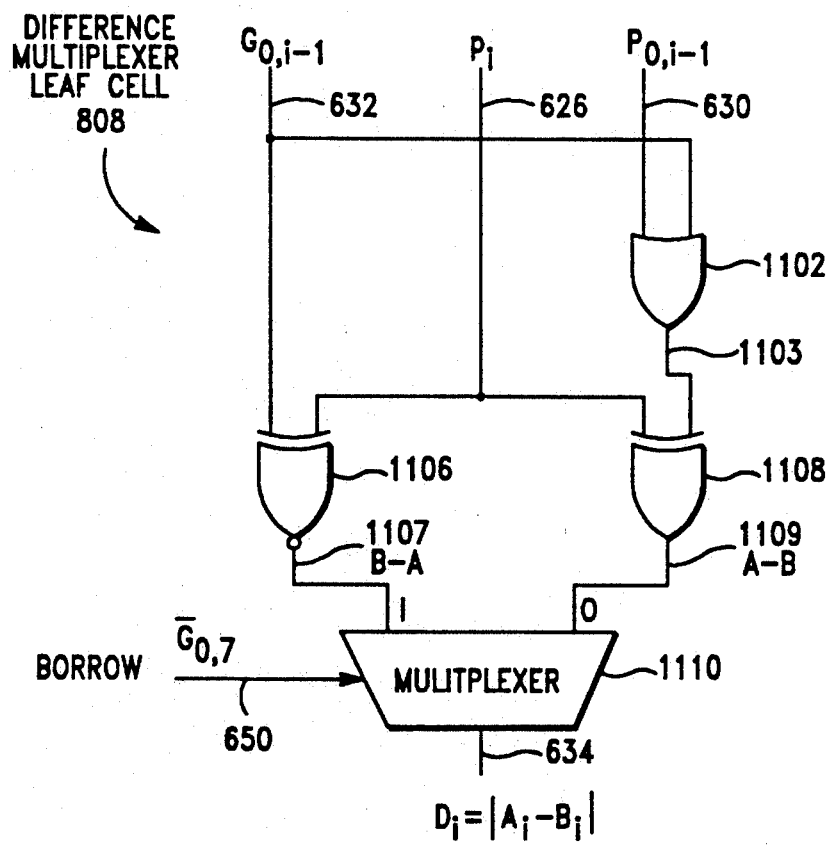
FIG. 11 illustrates a gate level implementation of a difference multiplexer leaf cell according to the present invention.

FIG. 11 illustrates a gate level implementation of difference multiplexer leaf cell 708. Difference multiplexer leaf cell 708 has four inputs: $G_{0,i-1}$ 632, $P_{0,i-1}$ 630, $p_i$ 626 and borrow (NOT $G_{0,7}$) 650. These inputs are logically combined to produce A−B 1109 and B−A 1107.

A−B 1109 is produced by passing inputs $G_{0,i-1}$ 632 and $P_{0,i-1}$ 630 through an OR gate 1102 to produce a signal 1103. Then signals $p_i$ 626 and 1103 are passed through an XOR gate 1108 to produce A−B 1109.

B−A 1107 is produced by passing signals $p_i$ 626 and $G_{0,i-1}$ 632 through XNOR gate 1106 to produce B−A 1107. As explained above, B−A equals NOT-(A−B−1).

From this point, the absolute value $D_i$ can be selected as either B−A 1107 or A−B 1109. Borrow signal 650 selects A−B or B−A. B−A 1107 is chosen if signal 650 is one. A−B 1109 is chosen if borrow signal 650 is zero. As explained above, borrow signal NOT $G_{0,7}$ 650 is the carry generate term from the MSB carry leaf cell 706 shown in FIG. 8.

It should be noted that for leaf cell 708 in the least significant bit (LSB) position of difference multiplexer 608, the inputs are fixed as: $G_{0,-1}=1$ and $P_{0,-1}=0$.

Figure 12:
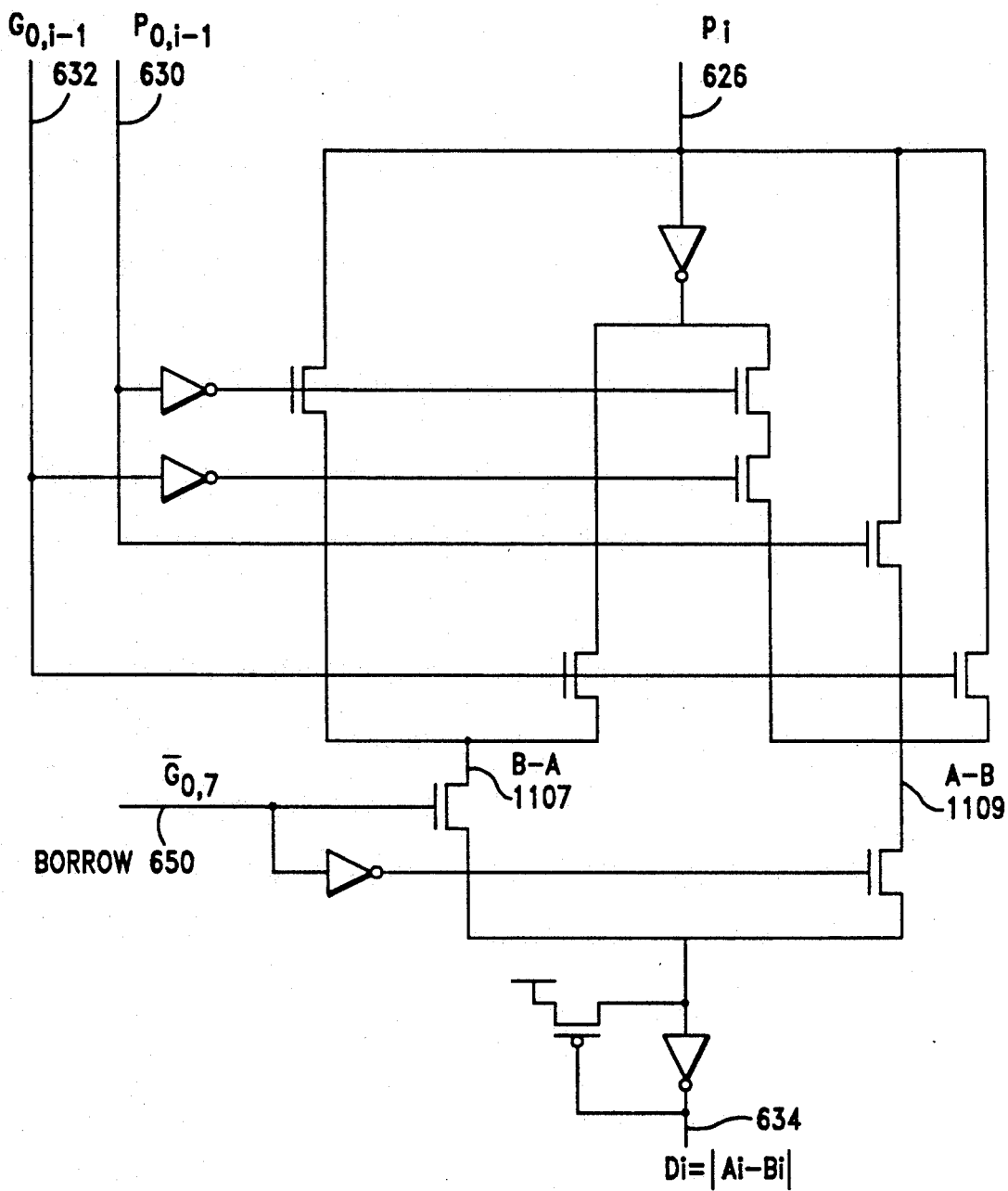
FIG. 12 illustrates the transistor level diagram of a difference multiplexer leaf cell according to the present invention.

FIG. 12 illustrates the transistor level diagram of difference multiplexer leaf cell 708. Notice that despite the complex functionality required of the difference multiplexer leaf cell (A−B, B−A, and a selection), only a minimal number of transistors are needed. In a preferred embodiment of difference multiplexer leaf cell 708 an all N-channel selector matrix in combination with CMOS inverters is used to implement the logical functionality in FIG. 11. As will be readily understood by those of ordinary skill in the art a P-channel pull-up device is used to raise the output voltage of the selector matrix to a full Vcc when a logical 1 is expected at its output.

IV. Example.

The following examples illustrate two possible cases: (1) minuend A is larger than subtrahend B and (2) minuend A is less than subtrahend B. These two examples use absolute value arithmetic unit 402 in a four bit implementation with reference to the above mentioned figures.

In the following two examples the same four bit inputs are used, $4_{10}$ and $2_{10}$. In example 3, $|4-2|=2$ is performed, and in example 4, $|2-4|=2$ is performed. In both examples, the four bits are written in binary format from left to right as bit 3, bit 2, bit 1, and bit 0.

|  | Example 3. |  | Example 4. |  |
|---|---|---|---|---|
| $A_{[3:0]}$ | 0100 | (4) | 0010 | (2) |
| $B_{[3:0]}$ | −0010 | −(2) | −0100 | −(4) |

Referring to FIG. 6, in a first step the four bit inputs $A_{[3:0]}$ 622 and $B_{[3:0]}$ 624 enter propagate-and-generate block 604. Each bit of A and B go to the appropriate propagate-and-generate leaf cell 704 shown in FIG. 7, producing four bit results $p_{[3:0]}$ 626 and $g_{[3:0]}$ 628 as shown below:

| $p_{[3:0]}$ | 1001 | 1001 |
|---|---|---|
| $g_{[3:0]}$ | 0100 | 0010 |

In a second step, propagate-and-generate signals $p_{[3:0]}$ 626 and $g_{[3:0]}$ 628 enter carry-chain 606. More particularly, propagate 626 and generate 628 signals enter a four-bit binary carry-chain having two levels.

The carry-chain-propagate and carry-chain-generate terms after the first level are as follows:

| $P_{2,3}P_{2,2}P_{0,1}P_{0,0}$ | 0001 | 0001 |
|---|---|---|
| $G_{2,3}G_{2,2}G_{0,1}G_{0,0}$ | 1100 | 0010 |

The carry-chain-propagate 630 and carry-chain-generate 632 signals after the second (and final) level of carry-chain-606 are as follows:

| $P_{0,3}P_{0,2}P_{0,1}P_{0,0}$ | 0001 | 0001 |
|---|---|---|
| $G_{0,3}G_{0,2}G_{0,1}G_{0,0}$ | 1100 | 0010 |

In a third step, carry-chain-outputs $P_{0,[3:0]}$ 630 and $G_{0,[3:0]}$ 632 enter difference multiplexer 608. In difference multiplexer 608 A−B and B−A are calculated as follows:

| $(A - B)_{[3:0]}$ | 0010 | 1110 |
|---|---|---|
| $(B - A)_{[3:0]}$ | 1110 | 0010 |

$G_{0,3}$ determines which difference A−B or B−A to select, resulting in the absolute value difference $D_{[3:0]}$ 634 as follows:

| $D_{[3:0]}$ | 0010 (2) | 0010 (2) |
|---|---|---|

As seen, both examples provide the correct expected result of +2.

V. Options

There are a number of options that can be added on to absolute value arithmetic unit 402 with very little penalty in speed or chip area. The options include: (1) extended functionality; (2) floating-point rounding; and (3) decimal arithmetic.

1. Extended functionality.

Figure 13:
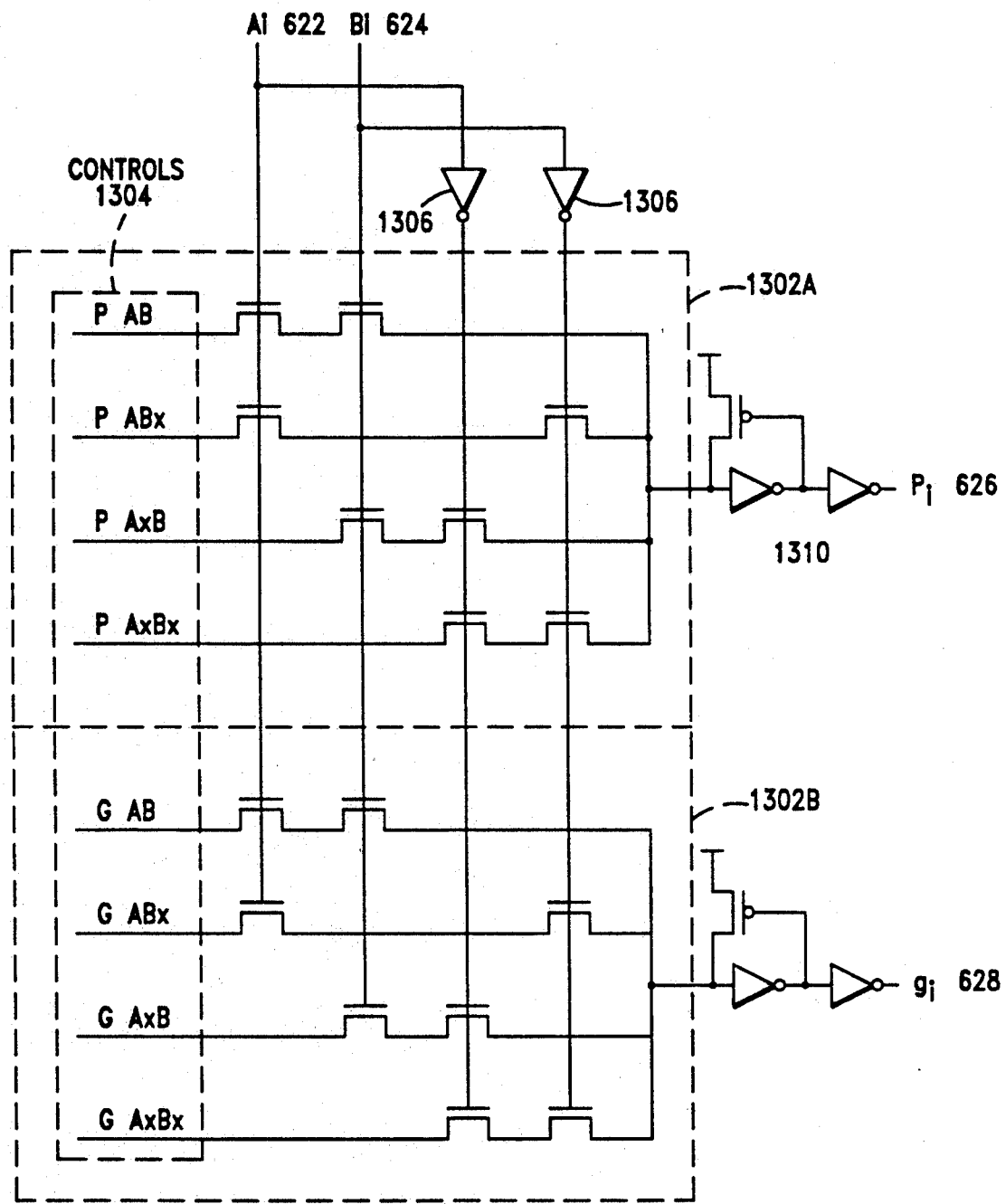
FIG. 13 illustrates dual 4 to 1 multiplexers that permit extended functionality.

With minor changes to propagate and generate block 604 there are a number of logical functions that can be implemented. They include all two input logical functions, such as AND, OR, NOR, XOR, XNOR, NAND, etc., as well as $|A|$, $|B|$, −A, −B, and ADDITION. FIG. 13 illustrates dual 4 to 1 multiplexers 1302A and 1302B that permit extended functionality, as mentioned above. Table A shown below illustrates a truth table showing bit inputs $A_i$ 622 and $B_i$ 624, with corresponding selected control signals 1304 selected as outputs $p_i$ 626 and $g_i$ 628.

TABLE A

| $A_i$ | $B_i$ | $p_i$ 626 | $g_i$ 628. |
|---|---|---|---|
| 0 | 0 | P_AxBs | G_AxBx |
| 0 | 1 | P_AxB | G_AxB |
| 1 | 0 | P_ABx | G_ABx |
| 1 | 1 | P_AB | G_AB |

Controls 1304 can be programmed to produce the desired functionality. For example, to implement subtraction, controls 1304 would be programmed as follows:

P_AB=1, P_ABx=0, P_AxBx=1, P_AxB=0;

G_AB=0, B_ABx=1, G_AxBx=0, G_AxB=0

While various embodiments of the present invention have been described above, it should be understood that they have been presented by way of example only, and not limitation. Thus, the breadth and scope of the present invention should not be limited by any of the above-described exemplary embodiments, but should be defined only in accordance with the subjoined claims and their equivalents.

What is claimed is:

1. An absolute value arithmetic unit comprising:

a propagate-and-generate block operable to receive two M-bit wide operands, A and B, and produce a first set of propagate and generate signals, as a function of said received operands, said propagate-and-generate block comprising N substantially identical propagate-and-generate circuits, each of said propagate-and-generate circuits having two input terminals and two output terminals, wherein M and N are predetermined integer values and $1 \leq M \leq N$;

carry-chain means, having a set of input terminals coupled to the output terminals of said propagate-and-generate circuits and a set of output terminals, for producing a first set of carry-chain-propagate and carry-chain-generate signals; and a difference multiplexer having a set of input terminals and a set of output terminals, operable to produce a first result equal to $(A_i - B_i)$ and a second result equal to $(B_i - A_i)$, where i is a single bit position, i=(M−1) is the most significant bit position, and i=0 is the least significant bit position;

wherein said difference multiplexer selects said $(A_i - B_i)$ result when a carry-chain-generate signal in the most significant bit position is in a first state and selects said $(B_i - A_i)$ result when said carry-chain generate signal in the most significant bit position is in a second state, said difference multiplexer being electrically coupled to said propagate-and-generate block and said carry chain; and wherein $|A_i - B_i|$ is produced at an output node of said difference multiplexer based upon one of said selections.

2. The absolute value arithmetic unit of claim 1, wherein each of said propagate-and-generate circuits comprises means to produce a generate signal ($g_i$) equal to $A_i$ AND NOT $B_i$ and a propagate signal ($p_i$) equal to $A_i$ XNOR $B_i$.

3. The absolute value arithmetic unit of claim 1, wherein said carry-chain means is comprised of logic circuitry operable to produce a carry-chain-propagate signal equal to $P_{j+1,k}$ AND $P_{i,j}$ and a generate signal equal to $G_{j+1,k}$ OR ($P_{j+1,k}$ AND $G_{i,j}$), wherein $1 \leq j \leq N$ and $1 \leq k \leq N$.

4. The absolute value arithmetic unit of claim 3, wherein said difference multiplexer is comprised of logic circuitry, operable to produce $|A_i - B_i|$ as being equal to [($G_{0,N-1}$ AND ($p_i$ XOR ($G_{0,i}$ OR $P_{0,i}$))) OR (NOT($G_{0,N-1}$) AND (NOT($p_i$ XOR $G_{0,i}$)))].

5. The absolute value arithmetic unit of claim 1, wherein said carry-chain means produces a carry-chain-propagate signal, generated from bit 0 to bit $M-1$, at said output terminals of said carry-chain means.

6. The absolute value arithmetic unit of claim 1, wherein said carry-chain means produces a carry-chain-generate signal, generated from bit 0 to bit $M-1$, at said output terminals of said carry-chain means.

7. A subtraction/addition core for an arithmetic unit comprising:

first, second, third and fourth propagate-and-generate leaf cell means, for receiving two M-bit wide operands A and B, for producing first, second, third and fourth signals as a function of said received operands, wherein each of said signals are comprised of a propagate and generate signal pair;

first carry-chain leaf cell means, electrically coupled to said first and second propagate-and-generate leaf cell means, for receiving said first and second signals and for producing a first carry-chain signal as a function of said received first and second signals, wherein a carry chain-chain signal is comprised of a carry-chain propagate and generate signal;

second carry-carry chain leaf cell means, electrically coupled to said third and fourth propagate-and-generate leaf cell means, for receiving said third and fourth signals and for producing a second carry-chain signal as a function of said received third and fourth signals;

third carry-chain leaf cell means, electrically coupled to said third propagate-and-generate leaf cell means and said first carry-chain leaf cell means, for receiving said third signal and said first carry-chain signal and for producing a third carry-chain signal as a function of said received third signal and said first carry chain signal; and fourth carry-chain leaf cell means, electrically coupled to said second carry-chain leaf cell means and said first carry-chain leaf cell means, for receiving said second and first carry-chain signals and for producing a fourth carry-chain signal as a function of said second and first carry-chain signals.

8. The subtraction/addition core of claim 7, further comprising:

fifth, sixth, seventh and eighth propagate-and-generate leaf cell means, for receiving said M-bit wide operands A and B, for producing fifth, sixth, seventh and eighth signals as a function of said received operands, wherein said signals are comprised of a propagate signal and a generate signal;

fifth carry-chain leaf cell means, electrically coupled to said fifth and sixth propagate-and-generate leaf cell means, for receiving said fifth and sixth signals and for producing a fifth carry-chain signal as a function of said received fifth and sixth signals, wherein a carry chain-chain signal is comprised of a carry-chain propagate and generate signal;

sixth carry-chain leaf cell means, electrically coupled to said seventh and eighth propagate-and-generate leaf cell means, for receiving said seventh and eighth signals and for producing a sixth carry-chain signal as a function of said received seventh and eighth signals;

seventh carry-chain leaf cell means, electrically coupled to said fifth carry-chain leaf cell means and to said seventh propagate-and-generate leaf cell means, for receiving said fifth carry-chain signal and said seventh signal, and for producing a seventh carry-chain signal as a function of said received fifth carry-chain signal and said seventh signal;

eighth carry-chain leaf cell means, electrically coupled to said fifth and sixth carry-chain leaf cells means for receiving said fifth and sixth carry-chain signals and for producing an eighth carry-chain signal as a function of said received fifth and sixth carry-chain signals;

ninth carry-chain leaf cell means, electrically coupled to said fourth carry-chain leaf cell means and said fifth propagate-and-generate leaf cell means, for receiving said fourth carry-chain signal and said fifth signal and for producing a ninth carry-chain signal as a function of said received fourth carry-chain signal and said fifth signal;

tenth carry-chain leaf cell means, electrically coupled to said fourth and fifth carry-chain leaf cell means, for receiving said fourth and fifth carry-chain signals and for producing a tenth carry-chain signal as a function of said received fourth and fifth carry-chain signals;

eleventh carry-chain leaf cell means, electrically coupled to said fourth and seventh carry-chain leaf cell means, operable to receive said fourth and seventh carry-chain signals and for producing an eleventh carry-chain signal as a function of said received fourth and seventh carry-chain signals; and twelfth carry-chain leaf cell means, electrically coupled to said fourth and eighth carry-chain leaf cell means, for receiving said fourth and eighth carry-chain signals and for producing a twelfth carry chain-signal as a function of said received fourth and eighth carry-chain signals;

wherein said first through fourth carry-chain signals and said ninth through twelfth carry-chain signals represent final carry-chain signals for said A and B operands.

9. The subtraction/addition core of claim 7, wherein said propagate-and-generate leaf cell means is comprised of logic circuitry operable to produce said generate signal as being equal to A AND NOT B and said propagate signal as being equal to A XNOR B.

10. The subtraction/addition core of claim 7, wherein said carry-chain leaf cell means is comprised of logic circuitry operable to produce said carry-chain propagate signal as being equal to $P_{j+1,k}$ AND $P_{i,j}$ and said generate signal as being equal to $G_{j+1,k}$ OR ($P_{j+1,k}$ AND $G_{i,j}$), wherein $1 \leq j \leq N$ and $1 \leq k \leq N$.

11. The subtraction/addition core of claim 7, wherein said first, second, third and fourth carry-chain leaf cell means comprise a carry-chain block having a set of output terminals, wherein said carry-chain block produces said carry-chain-propagate signal and said carry-chain-generate signal, generated from bit 0 to bit $N-1$, at said output terminals of said carry-chain block.

12. A difference multiplexer leaf cell electrically coupled to a subtraction/addition core having a propagate-and-generate block and a carry-chain block, said subtraction/addition core for producing a carry-chain propagate signal ($P_{0,i-1}$), a carry-chain generate signal ($G_{0,i-1}$), and a propagate signal ($p_i$), said difference multiplexer leaf cell for obtaining an $|A_i-B_i|$ signal, wherein A and B are M-bit wide operands and $1 \leq M$ and i is a single bit position, $i=(M-1)$ is the most significant bit position, and $i=0$ is the least significant bit position, said difference multiplexer comprising:

(a) first and second logic circuits having inputs to receive from the subtraction/addition core, the carry-chain propagate signal ($P_{0,i-1}$), the carry-chain generate signal ($G_{0,i-1}$), and the propagate signal ($p_i$);

wherein said first logic circuit is operable to produce a first output signal ($A_i-B_i$) which is equal to ($p_i$ XOR ($G_{0,i}$ OR $P_{0,i}$));

wherein said second logic circuit is operable to produce a second output signal ($B_i-A_i$) which is equal to NOT($p_i$ XOR $G_{0,i}$); and (b) a selector circuit electrically coupled to said first and second logic circuits having an input to receive a borrow signal from the most significant bit position of the subtraction/addition core, said selector circuit operable to select either said ($A-B$) signal or said ($B-A$) signal based upon a logical state of said borrow signal;

wherein $|A_i-B_i|$ is produced at an output node of said selector circuit based upon one of said selections.

13. The difference multiplexer leaf cell of claim 12, wherein said selector circuit is a multiplexer comprised of logic circuitry, [(NOT($G_{0,N-1}$) AND ($A_i-B_i$)) OR (($G_{0,N-1}$) AND ($B_i-A_i$))], operable to produce $|A_i-B_i|$, wherein said ($A_i-B_i$) signal is selected at said output node of said selector circuit when said borrow signal, NOT($G_{0,N-1}$), is a logic low value, and said ($B_i-A_i$) signal is selected at said output node of said selector when said borrow signal, NOT($G_{0,N-1}$), is a logic high value.

* * * * *